United States Patent
Peterson et al.

(10) Patent No.: US 6,600,127 B1
(45) Date of Patent: Jul. 29, 2003

(54) METHOD AND APPARATUS FOR DIRECT ELECTROTHERMAL-PHYSICAL CONVERSION OF CERAMIC INTO NANOPOWDER

(75) Inventors: Dennis Roger Peterson, Austin, TX (US); Dennis Eugene Wilson, Austin, TX (US); Darrin Lee Willauer, The Woodlands, TX (US)

(73) Assignee: Nanotechnologies, Inc., Austin, TX (US)

( * ) Notice: Subject to any disclaimer, the term of this patent is extended or adjusted under 35 U.S.C. 154(b) by 0 days.

(21) Appl. No.: 09/661,330

(22) Filed: Sep. 13, 2000

Related U.S. Application Data

(63) Continuation-in-part of application No. 09/396,046, filed on Sep. 15, 1999.

(51) Int. Cl.$^7$ ................................................ B23K 10/00
(52) U.S. Cl. ........................... 219/121.43; 219/121.48; 219/121.52; 219/121.59; 219/121.41; 75/10.19; 75/10.21; 423/DIG. 10
(58) Field of Search .................. 219/121.47, 76.16, 219/121.36, 121.48, 121.52, 121.59, 121.43, 121.41; 427/255.1, 255.3, 255.2, 223, 249, 450, 576; 423/325, 345, 346, 440, DIG. 10; 75/10.19, 10.21

(56) References Cited

U.S. PATENT DOCUMENTS

| | | |
|---|---|---|
| 4,640,180 A | 2/1987 | Rose |
| 4,642,207 A | 2/1987 | Uda et al. |
| 5,128,081 A | 7/1992 | Siegel et al. |
| 5,147,448 A * | 9/1992 | Roberts et al. ............... 75/331 |
| 5,149,381 A | 9/1992 | Grewe et al. |
| 5,355,764 A | 10/1994 | Peterson et al. |
| 5,503,081 A | 4/1996 | Lindblom et al. |
| 5,688,417 A | 11/1997 | Cadre et al. |
| 5,770,022 A | 6/1998 | Chang et al. |
| 5,851,507 A | 12/1998 | Pirzada et al. |
| 5,876,683 A | 3/1999 | Glumac et al. |
| 5,935,461 A * | 8/1999 | Witherspoon et al. ... 219/76.16 |
| 6,132,563 A | 10/2000 | Hunt et al. |

FOREIGN PATENT DOCUMENTS

| | | |
|---|---|---|
| EP | 0 282 291 A2 | 3/1988 |
| EP | 63199470 | 8/1988 |
| WO | WO 01/20953 A1 | 3/2001 |

OTHER PUBLICATIONS

Attorney Docket No. 0309JM–35542 Appl. No., Dennis R. Peterson, et al.
Attorney Docket No. 0309JM–35542PTO Appl. No. PCT/US 00/25163, Nanotechnologies, Inc., Application Filed: Sep. 14, 2000.
Attorney Docket No. 0309JM–35542B; Appl. No. 09/695,465, Dennis R. Peterson, et al., Application Filed: Oct. 24, 2000.

(List continued on next page.)

*Primary Examiner*—Mark Paschall
(74) *Attorney, Agent, or Firm*—Gerald E. Lester

(57) ABSTRACT

A process for synthesizing nanosized powders utilizes a hybrid exploding wire device containing a solid metal wire fuse in the bore of a tube that is open at each end. The ends of the fuse are connected to electrodes on the ends of the tube. The electrodes are designed to erode to maintain a heavy metal plasma. The bore may comprise a corresponding ceramic to be produced, and a microcrystalline powder of a corresponding ceramic may be retained within the bore. An electrical discharge vaporizes and ionizes the fuse. The tube confines the radial expansion of the plasma such that the plasma exits from both ends of the tube where it reacts with a suitable gas to form nanoscale particles. In addition, the plasma gas ablates and vaporizes a portion of the bore wall to contribute to the nanoceramic synthesis. Other alternatives include replacing the fuse with a thin conductive sheath or a consumable metal insert.

33 Claims, 9 Drawing Sheets

OTHER PUBLICATIONS

Bourham, Gilligan, and Hankins, *AIAA* 93–3172 *Plasma–Material Interaction in Electrothermal and Electromagnetic Launchers*, AAIA 24th Plasmadynamics & Lasers Conference, 07/6–Sep. 1993, American Institute of Aeronautics and Astronautics, Washington, D.C.

Raja, Varghese, and Wilson, *Modeling of the Electrogun Metal Vapor Plasma Discharge*, Journal of Thermophysics and Heat Transfer, Jul.–Sep. 1997, pp. 353–360, vol. 11, No. 3, American Institute of Aeronautics and Astronautics, Washington, D.C.

* cited by examiner

METHOD AND APPARATUS FOR DIRECT ELECTROTHERMAL-PHYSICAL CONVERSION OF CERAMIC INTO NANOPOWDER

This application is a continuation-in-part of U.S. patent application Ser. No. 09/396,046, filed Sep. 15, 1999, entitled "Method and Apparatus for Direct Electrothermal-Physical Conversion of Ceramic into Nanopowder," which is incorporated herein by reference.

BACKGROUND OF THE INVENTION

1. Field of the Invention

The present invention generally relates to a method and system for the production of submicron materials, and in particular to a method and system of synthesizing, in bulk quantities, nanosized powders, including nanocrystalline ceramics. Even more particularly, the present invention relates to a method and system for increasing the rate and thereby reducing the cost of the production of bulk quantities of nanosized powders by electrothermal gun synthesis.

2. Description of Related Art

Ceramic materials are used in a wide variety of applications, and generally have excellent heat resistance, corrosion resistance, and abrasion resistance, as well as unique electrical and optical properties. Ceramic material, as used herein, generally refers to an oxide, nitride, boride or carbide of a metal, or a mixture thereof. Very fine ceramic powders are used in a large number of industrial processes to introduce or modify material properties. These materials can pose difficulties in sintering but, when they are converted to ultrafine particles, particularly submicron crystalline particles, numerous traditional problems are avoided. Accordingly, several processes have been devised for fabricating ultrafine, or submicron, crystalline materials, such as those of 1–500 nanometer size, referred to herein as "nanosized," "nanocrystalline," "nanoparticles," and the like.

Techniques for producing nanocrystalline materials generally fall into one of three categories, namely, mechanical processing, chemical processing, or physical (thermal) processing. In mechanical processes, fine powders are commonly made from large particles using crushing techniques such as a high-speed ball mill. There are several disadvantages with this approach.

Sometimes metallic powders and highly reactive metals are combined with and subjected to such milling, which can pollute the material with a nanocrystalline alloy. Fragmented powders produced by mechanical processes can also result in particles of inconsistent shapes and sizes, and are often coarse and so not suited for high-performance applications.

With chemical processes, nanocrystalline materials are created from a reaction that precipitates particles of varying sizes and shapes, using a family of materials known as organometallics (substances containing combinations of carbon and metals bonded together). It is difficult, however, to produce ultrafine ceramics using organometallics without introducing excess carbon, or nitrogen (or both) into the final composition. Solution-gelation (sol-gel) ceramic production is similar to organometallic processes, but sol-gel materials may be either organic or inorganic. Both approaches involve a high cost of raw materials and capital equipment, limiting their commercial acceptance.

One of the earliest forms of physical, or thermal, processing, involves the formation and collection of nanoparticles through the rapid cooling of a supersaturated vapor (gas phase condensation). See, e.g., U.S. Pat. No. 5,128,081. In that example, a raw metallic material is evaporated into a chamber and raised to very high temperatures, and then oxygen is rapidly introduced. See also U.S. Pat. No. 5,851,507, in which a carrier medium is mixed with precursor material which is vaporized and subsequently rapidly quenched.

Thermal processes create the supersaturated vapor in a variety of ways, including laser ablation, plasma torch synthesis, combustion flame, exploding wires, spark erosion, electron beam evaporation, sputtering (ion collision). In laser ablation, a high-energy pulsed laser is focused on a target containing the material to be processed. The high temperature of the resulting plasma (greater than 10,000° K.) vaporizes the material so quickly that the rest of the source (any carrier and quenching gases) can operate at room temperature. The process is capable of producing a variety of nanocrystalline ceramic powders on the laboratory scale, but it has the great disadvantage of being extremely expensive due to the inherent energy inefficiency of lasers, and so it not available on an industrial scale.

The use of combustion flame and plasma torch to synthesize ceramic powders has advanced more toward commercialization. In processes, the precursor material can be a solid, liquid or gas prior to injection into the flame or torch, under ambient pressure conditions (the most common precursor state is a solid material). The primary difference between the two processes is that the combustion flame involves the use of an oxidizing or reducing atmosphere, while the plasma torch uses an inert gas atmosphere. Each of these processes requires relatively expensive precursor chemicals, such as $TiCl_4$ for the production of $TiO_2$ by the flame process, or TiC and $TiB_2$ by the plasma process. A feature of both methods is the highly agglomerated state of the as-synthesized nanocrystalline ceramic powders. While for many applications the agglomeration of the powders is of little significance, there are situations where it is a shortcoming. Loosely agglomerated nanoparticle powders are produced in the combustion flame method of U.S. Pat. No. 5,876,683.

In the plasma process, reactants or feed materials are delivered to a plasma jet produced by a plasma torch. See generally, U.S. Pat. Nos. 4,642,207 and 5,486,675. Alternatively, the feed material may be delivered to the plasma stream by arc vaporization of the anode. The anode is normally metallic but may be a metal-ceramic composite. An improved plasma torch process is described in U.S. Pat. No. 5,514,349. That process can produce non-agglomerated ceramic nanocrystalline powders starting from metalorganic precursors, and uses rapid thermal decomposition of a precursor/carrier gas stream in a hot tubular reactor combined with rapid condensation of the product particle species on a cold substrate. Plasma torch processes, while gaining some limited commercial acceptance, are still energy inefficient and often involve materials which are extraneous to the products being produced. For example, in the '349 patent, a working gas must be heated by the plasma arc, which is wasted energy. Also, since the product particles are suspended in the hot process gas stream, it is necessary to quench not just the particles but the process stream as well. The multiple gases used (the reaction gas, quench gas, and passivating gas) are either wasted, or must be separated for reuse.

Another apparatus for producing nanosized particles is the exploding wire device. A conventional exploding wire device is illustrated in FIG. 5. A pulsed current discharge is driven through a small diameter wire that is typically on the order of 0.1 mm. The resulting joule heating of the wire vaporizes and ionizes the wire resulting in plasma which expands radially. The nearly cylindrical plasma contact surface which expands into the ambient gas, undergoes a reaction with the gas and subsequently cools. The mixing process relies on molecular diffusion and the cooling process is nearly isentropic. Production rates are typically only a few milligrams owning to the small diameter wire necessary for complete vaporization.

Another device that builds on the exploding wire method is a conventional capillary plasma device, shown in FIG. 6. Conventional capillary plasma devices produce hydrocarbon-based plasmas that are used to ignite explosives because the plasma will not negatively react with the explosive. The capillary plasma device consists of two non-eroding electrodes positioned at the ends of a non-conducting bore with one open end. A fuse wire is connected between the electrodes. The process begins with an electrical discharge that explosively vaporizes and ionizes the fuse wire between the two electrodes. The discharge is maintained by the erosion and subsequent ionization of the liner to produce a dense plasma inside the bore which then exits from the open end of the device. The sealed end or breech of the gun must be capable of withstanding extremely high pressures in the order of 10,000 psi. The plasma exits the gun and is then used to ignite the explosive. The length to diameter ratio of bore, L/D, is large which helps to promote bore wall erosion to sustain the discharge. This process is not well suited for ceramic production because the erosion of a ceramic bore would not produce the ionization needed to sustain the plasma and consequently the production would be low.

The electrothermal gun, also known as an electrogun or capillary discharge device (shown in FIG. 7), is a pulsed power device for the production of very high velocity plasma jets and vapors of different metals such as aluminum or titanium. A pulsed, high current arc is struck down the barrel of a gun, between an electrode in the breech of the gun and an electrode at the muzzle. This arc produces rapid vaporization of the electrodes and of the barrel of the gun so that a pulsed, high-temperature, high-velocity plasma jet is fired out the muzzle.

Electrothermal guns are superficially similar to plasma torches. In a plasma torch, an electric arc is used to convert a gas stream into a plasma jet. Electrothermal guns have been used for a variety of applications such as laboratory plasma producers, spacecraft thrusters, propellant ignitors for high performance guns, and plasma armature sources for electromagnetic rail guns. Electrothermal guns also have been used to vaporize and project an initially liquid gas (such as argon) to atomize an external stream of molten metal. In addition, electrothermal guns have been used to heat and propel powdered material for the application of coatings. "Electrothermal gun synthesis" is the use of an electrothermal gun to synthesize nanomaterials such as powdered material with particle sizes of approximately 100 nanometers or less. The plasma jet itself is converted physically or physically and chemically into ultra-fine powder. The material composing the plasma jet typically comes from the breech electrode or the muzzle electrode.

In operation, it is frequently necessary to change the breech electrode of the gun. For production of bulk quantities, it is an economic necessity to accomplish this change automatically rather than manually. Thus, simplification of the breech electrode replacement process produces significant cost reduction. For proper operation, the breech electrode must form an effective seal against the reverse flow of high-pressure plasma. The breech electrode is installed with a high-force mechanical preload to insure that the seal remains effective against the sudden onset of high-pressure plasma. In addition, a heavy-duty electrical connection to the breech electrode must be effected. A final consideration is that when the breech electrode is changed, the stub end of the breech electrode is wasted. A method and system for increasing the production rate and reducing the cost of the production of bulk quantities of nanosized powders by electrothermal gun synthesis is needed to overcome these limitations.

SUMMARY OF THE INVENTION

The limitations of the prior art are overcome by a new process for the synthesizing nanosized powders. The process utilizes a "hybrid exploding wire" (HEW) device containing a small diameter solid metal fuse wire or foil sheath inside a cylindrical tube. The ends of the fuse are connected to electrodes which are designed to have sufficient erosion to maintain the heavy metal plasma. The cylindrical tube is designed to contain the large pressures generated when the plasma is produced. The bore may be made of but is not limited to the corresponding ceramics to be produced. Microcrystalline powder of corresponding ceramic may also be retained within the bore.

The process is initiated with an electrical discharge that vaporizes and ionizes the fuse. The tube confines the radial expansion of the plasma which forces it to exit from both ends of the tube where it mixes and reacts with a suitable gas to form nanoscale particles. In addition, the plasma gas will ablate and vaporize the bore wall contributing to the nanoceramic synthesis.

The benefits of the current invention are both chemical, via reaction of the metal vapor with the reaction gas, and physical via ablation of the bore wall, conversion processes are employed to produce the nanocrystalline ceramics. Having the plasma exit both ends of the bore eliminates the problems associated with high pressure breech seals and eliminates the corresponding forces because the internal pressures are used to balance each other. The dual bore also allows increased production by simultaneously operating two guns.

In an alternate embodiment, the fuse wire is replaced with a thin conductive sheath. The conductive sheath fits inside the bore which has been undercut to form an annular area. The annular area is filled with micron sized particles of the desired compound, reactant metal, or combination thereof. The process is initiated as described earlier and the conductive sheath is instantly vaporized. The micron particles are exposed to the plasma where they are vaporized and ejected with the plasma. The plasma jet with the ceramic vapor is rapidly cooled and nanosized particles are formed. The large surface area to volume ratio of the microparticle material overcomes the problems with low production rates by allowing quick and efficient conversions to nanoparticle ceramics.

In another embodiment, a consumable metal insert is placed in the center of the bore. In this version, a spark progresses from one electrode to the metal insert, and then from the insert to the other electrode. The metal insert is eroded and/or vaporized to sustain the discharge and increase production of the nanosized material. The external electrodes can be made of tungsten in an effort to minimize erosion so that they do not have to be replaced. Because the metal insert is in the center, the forces on it are symmetrical and they will balance one another. This eliminates the need for high pressure seals. In addition, there is no electrical contact on the metal insert so that it can be replaced quickly and easily, thus facilitating higher rates of production over prior art methods.

It is one object of the present invention to expedite changing the breech electrode of an electrothermal gun.

It is another object of the present invention to eliminate material waste by providing for complete consumption of the breech electrode without leaving a stub or heel.

The foregoing objects are achieved by modifying the design of the electrothermal gun to simplify installation of the breech electrode. The modified design is open at both ends, and the breech electrode is replaced by a central electrode. In operation, two opposing electrothermal jets are produced, one exiting from each of the two open ends of the gun. There are no mechanical electrical (i.e., direct) connections to the central electrode. Current is transferred to the central electrode by two arcs, one arc attaching to each end of the central electrode. There is little or no pressure differential between the two ends of the central electrode, so the need to provide a seal is eliminated. Also, if a pressure differential does develop between the two ends of the central electrode, there is no adverse consequence to the leakage of plasma and molten metal across the central electrode.

The above as well as additional objectives, features, and advantages of the present invention will become apparent in the following detailed written description.

BRIEF DESCRIPTION OF THE DRAWINGS

The novel features believed characteristic of the present invention are set forth in the appended claims. However, the invention itself as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
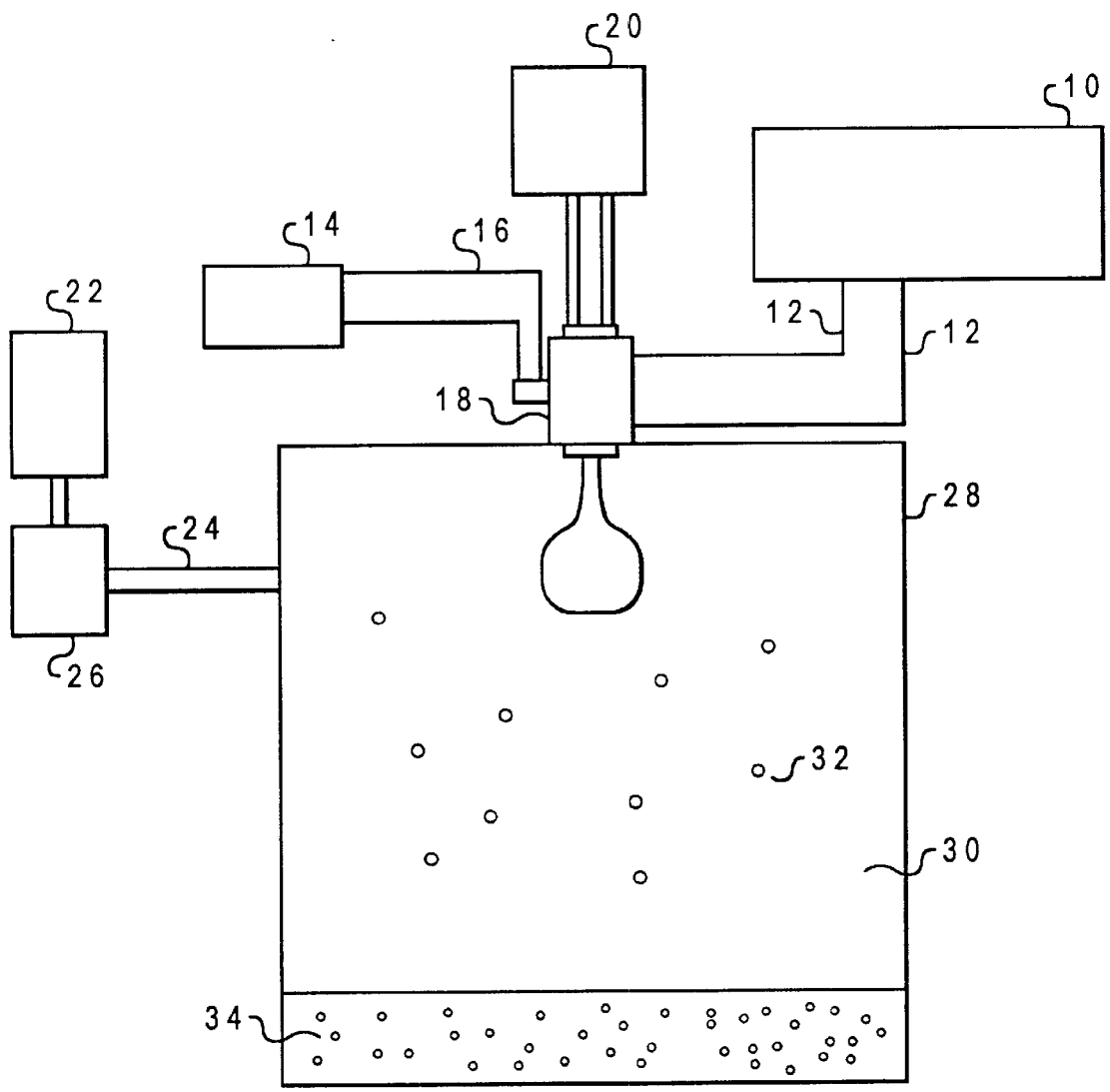
FIG. 1 is a schematic diagram of a system for electrothermal synthesis of nanocrystalline ceramics.

With reference now to the figures, and in particular with reference to FIG. 1, there is depicted one embodiment 8 of an electrothermal system for synthesizing ceramic nanopowders constructed in accordance with the present invention. System 8 is generally comprised of a high-current electrical power supply 10 with heavy-duty wiring 12 for conducting an energetic current pulse, an arc initiator power supply 14 with wiring 16, a ceramic electrothermal gun (electrogun) 18 with a cooling system 20, a reactor atmosphere supply system 22 with a supply pipe 24 and atmosphere control system 26, and a reactor vessel 28 having a reactor atmosphere 30 illustrated with suspended nanoparticles 32, and a layer of settled nanopowder 34 on the floor of the vessel. As explained further below, power supply 10 provides pulsed current to electrogun 18 in concert with initiation of an arc by initiator power supply 14, which results in activation of electrogun 18. A plasma stream from electrogun 18 entrains raw metal precursor material and ceramic precursor material which become vaporized in reactor vessel 28, and subsequently condense as nanocrystalline particles 32.

Figure 2:
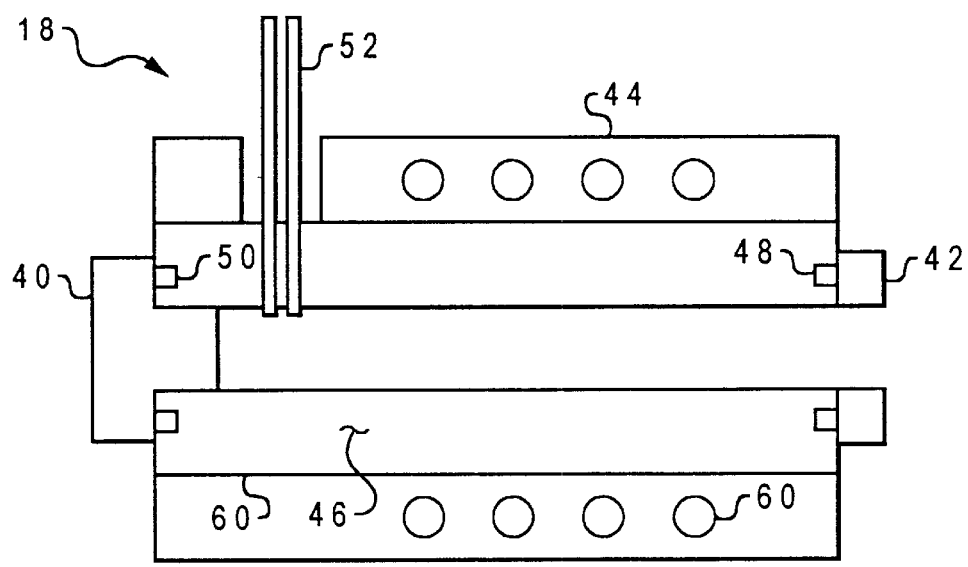
FIG. 2 is a cross-sectional view of an electrothermal gun used with the system of FIG. 1.

Referring now to FIG. 2, electrogun 18 may be constructed in a fashion similar to conventional electrothermal guns (such as those used for spacecraft thrusters, the production of railgun plasma armatures, or the ignition of propellants to accelerate projectiles in guns), except that electrogun 18 is provided with a ceramic barrel, that is, a barrel whose material is the same (chemically, although not in the same physical state) as the nanopowder which is desired to be produced. In an illustrative embodiment, electrogun 18 includes a cathode 40, a non-eroding anode 42, a structural shell or housing 44 with coolant channels 60, a ceramic liner 46 forming the gun barrel, a muzzle seal 48, a breech seal 50, and arc initiator lines 52.

In contrast with prior art electroguns, the material of ceramic liner 46 is specifically selected to erode during generation of the plasma stream within the bore of electrogun 18. The synthesis process thus preferably includes the generation of nanosized particles from both (1) the reaction of the metallic (or organometallic) cathode 40, and (2) the physical conversion of the material of ceramic liner 46 to a nanosized form as a result of the gun blast. Preferably, electrogun 18 has a length-to-diameter ratio of at least ten.

Figure 3:
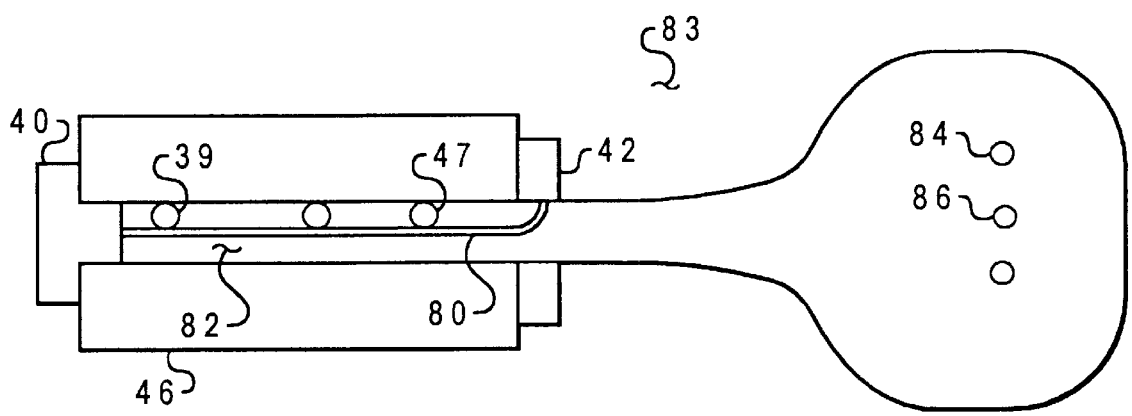
FIG. 3 is a pictorial representation of the synthesis of nanocrystalline ceramic powder using the system of FIG. 1.

The synthesis process is illustrated further in FIG. 3. Power is supplied to cathode/anode pair 40/42 via power supply 10 while an electric arc is established via initiator lines 52. The high-current electric arc 80 passes between cathode 40 and anode 42, and a high-pressure, high-velocity, high-temperature stream of plasma 82 flows down the bore of electrogun 18. Ceramic material 47 is ablated from ceramic liner 46, and become entrained in plasma stream 82. Particles thus entrained lose mass through vaporization, and become smaller or vaporize completely. Reactant material 39 from cathode 40 also becomes entrained in plasma stream 82.

As the high-pressure plasma exits the confines of electrogun 18, it undergoes rapid isotropic expansion. One result of the rapid expansion is a rapid cooling. The cooled plasma then condenses into a high-velocity spray of extremely fine (nanosize) ceramic particles 84. The energetic expansion produces turbulent mixing of the condensed droplets or particles with the reactor atmosphere 83. Any metallic particles 86 produced by electrode erosion or by disassociation of ceramic quickly react with the reactor atmosphere 83, forming ceramic particles 84. Thus, a suspension of nanoparticles is produced, which gradually settle to the floor of the reactor vessel where they may be collected.

The reactor atmosphere serves two primary purposes, to react any metal particles which may be mixed in with the ceramic particles, and to rapidly quench the ceramic particles, since unquenched particles would tend to bond tightly together or even grow together into a single particle. Quenched particles may stick together, but more loosely than hot particles. Quenched particles do not tend to grow into a single particle.

Accordingly, the electrothermal synthesis taught herein provides a method for the direct and efficient conversion of ceramic material into ceramic nanopowder, thereby realizing a material cost saving in comparison to competing methods. Energy costs are also reduced inasmuch as the ceramic feed material is heated directly rather than indirectly as is the case of prior art plasma torch processes. The present invention, unlike plasma torch processes, requires no working gas. There is no mixing of gas streams, and no circulation of the reactor atmosphere through the plasma arc, and further there is no need to use a refrigerated quenching surface. Reactions go to completion quickly. The technique has proven particularly suitable for production of titanium and aluminum oxide and nitride. No byproducts are produced, and the process is well-suited for automation.

Figure 4:
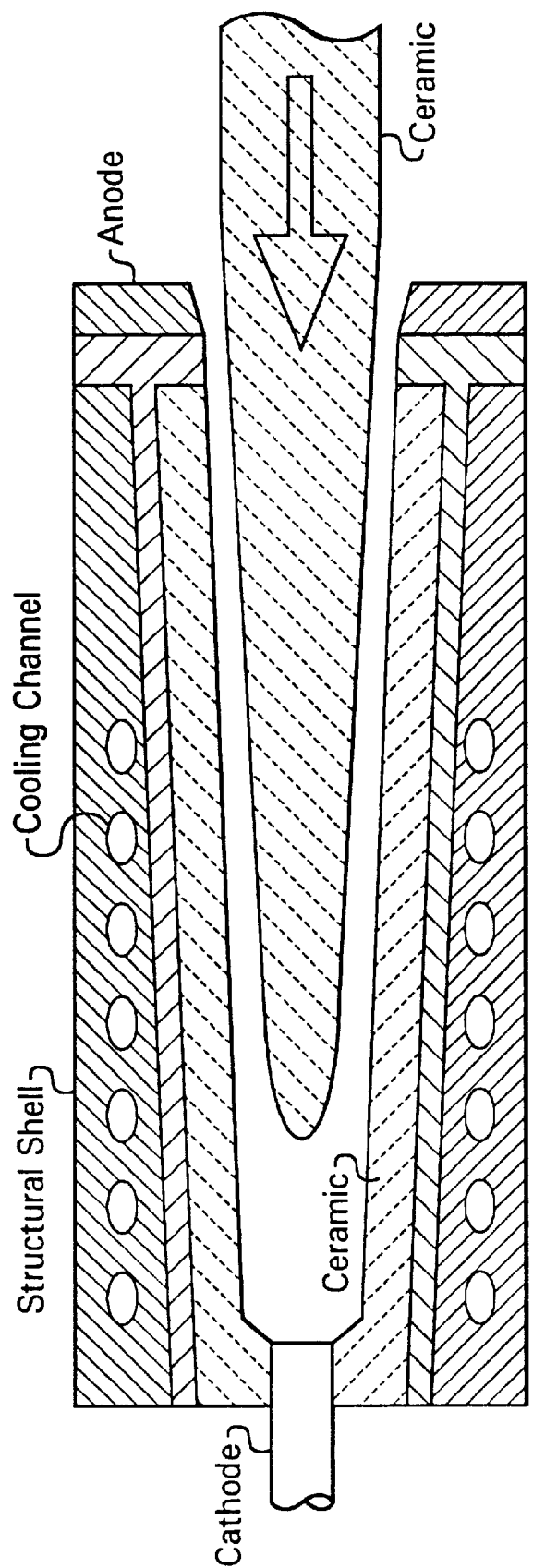
FIG. 4 is a cross-sectional view of an alternative electrothermal gun.
Figure 5:
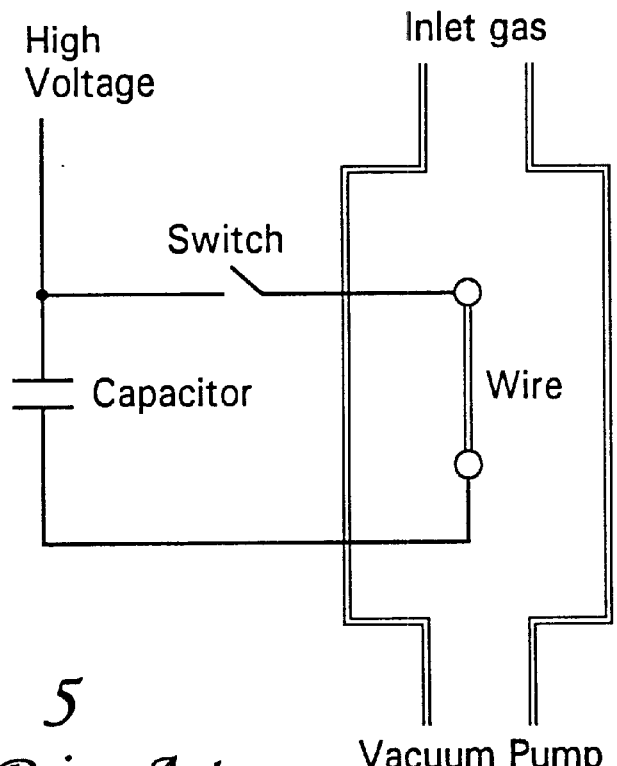
FIG. 5 is a schematic drawing of a prior art exploding wire device.
Figure 6:
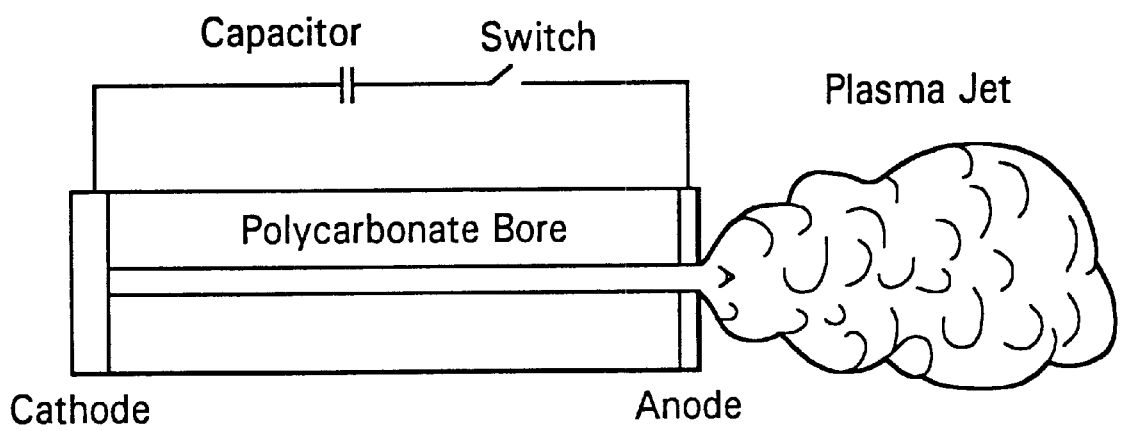
FIG. 6 is a schematic drawing of a prior art capillary plasma device.
Figure 7:
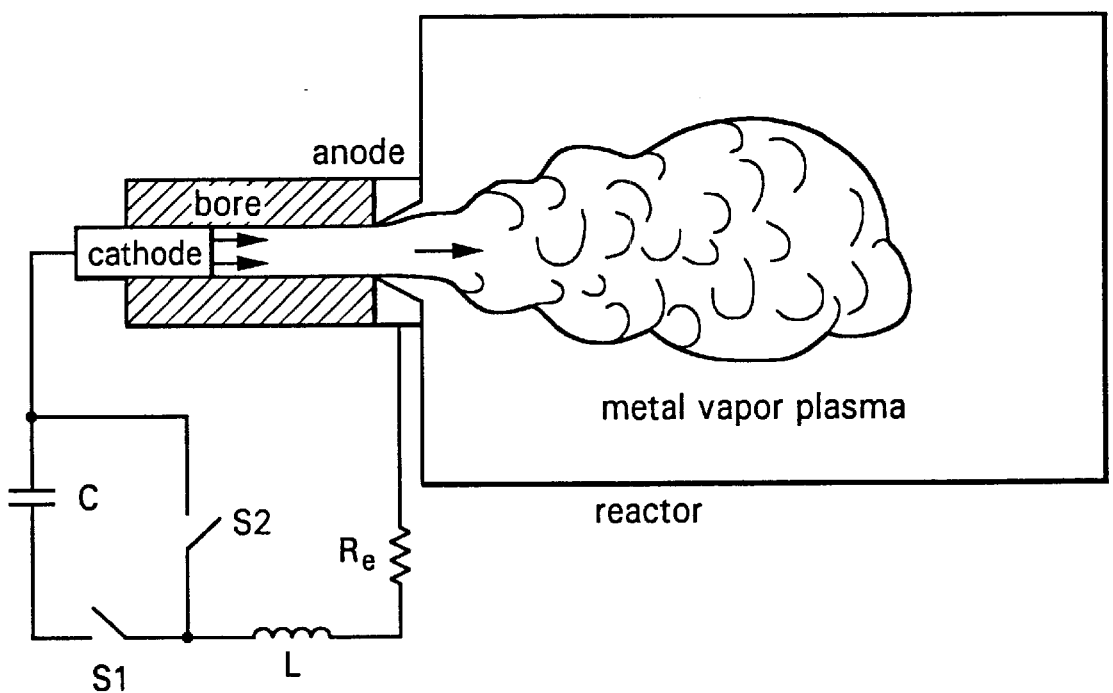
FIG. 7 is a schematic drawing of a prior art electrothermal gun.

FIG. 4 illustrates an alternative embodiment for an electrogun 70 which may be used with the present invention. Electrogun 70 has a conical, rather than cylindrical, bore. Additionally, a ceramic insert 72 having a cylindrical body 74 and a conical tip 76 is advanced into the bore. The conical bore and conical tip 76 form a divergent annular passageway. Ceramic material which is to be physically converted to nanopowder is extracted from both the ceramic bore liner and insert 72. In this manner, the insert is easily changed when it has been consumed (i.e., it is used for more than one shot of electrogun 70). The replacement of insert 72 is particularly advantageous since it is more easily eroded than the bore liner, and the liner is less conveniently replaced. The cross-sectional area of the annular passageway is easily adjusted by changing the axial (longitudinal) position of the insert, so simple adjustments compensate for erosion of the conical bore liner as well (to maintain a particular passageway cross-section). Erosion of the passageway is actually self-adjusting, since erosion will be greater where the passageway is smaller, and vice-versa. Physical properties of the insert can be adjusted to favor erosion of the insert. For example, it can be made relatively porous.

In another embodiment, the ceramic precursor material may be injected as particulates into the plasma stream, wherein the ceramic precursor particulates have a first size (e.g., micron or larger), and the ceramic particles suspended in the vessel have a second size which is substantially smaller than the first size (e.g., nanosized). The precursor material would preferably be injected radially in the breech region, allowing sufficient residence time within the gun. The injection technique may be combined with the above-described technique using the ceramic liner 46 which erodes during generation of the plasma stream.

Figure 8:
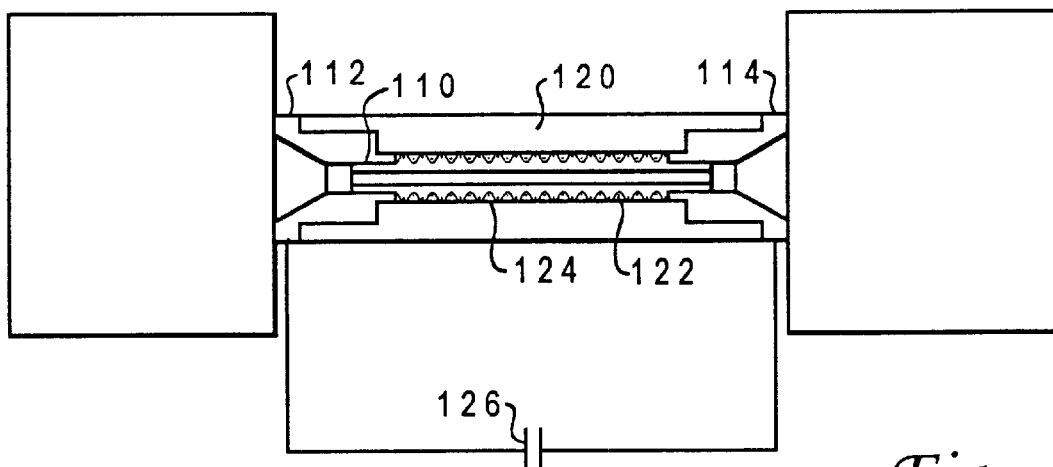
FIG. 8 is a schematic diagram of a hybrid exploding wire device having dual bores constructed in accordance with a first embodiment of the present invention and showing an initial processing stage.
Figure 9:
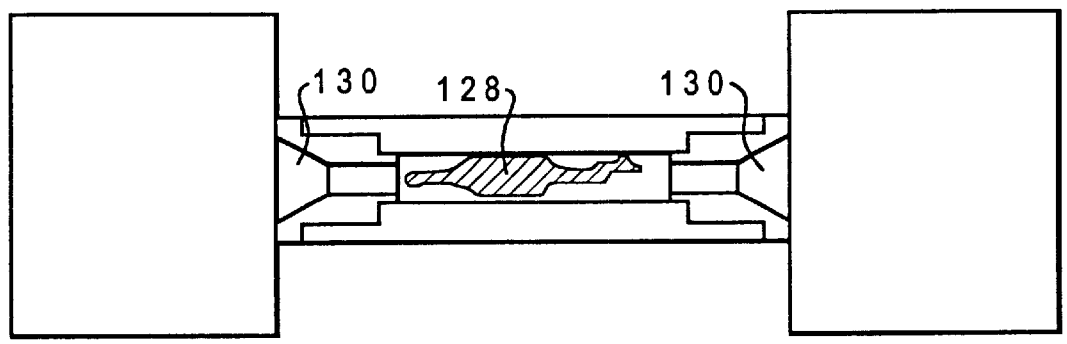
FIG. 9 is a schematic diagram of the hybrid exploding wire device of FIG. 8 showing an intermediate processing stage.
Figure 10:
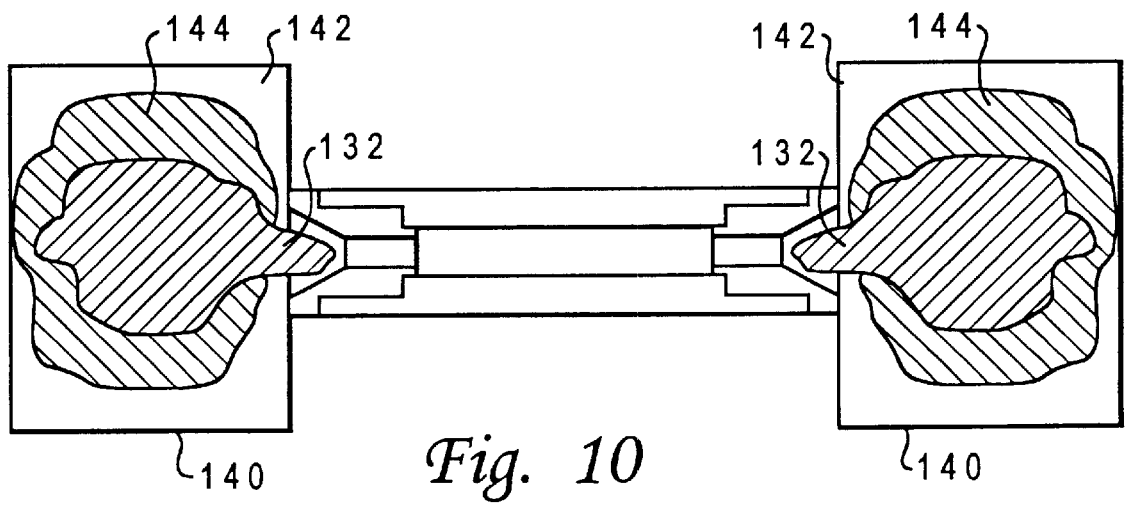
FIG. 10 is a schematic diagram of the hybrid exploding wire device of FIG. 8 showing a final processing stage.

FIGS. 8–10 provide step-by-step, schematic diagrams of a new process using a preferred embodiment of the present invention that is configured to produce nanocrystalline alumina ($Al_2O_3$). A thin metal wire or sheath 110, in this case aluminum, is placed between the cathode 112 and anode 114 in the bore 120 of a reactor vessel having at least two exit ports. Sheath 110 acts as a fuse that initiates a discharge. The fuse is the same material as the cathode and anode, so as to eliminate contamination. The cathode and anode are positioned on each end of a bore 120. The bore is preferably made from the same material as that which is being produced and is designed to contain the pressures that are produced during the process. The bore may contain microparticles 122 of the material to be produced. In the current invention, the microparticles are positioned within an annular volume 124 between the bore and the fuse and held in place by the fuse sheath. In alternate embodiments, the material may be contained in a thin tube placed within the bore having a fuse wire passing through the tube to connect both electrodes. The microparticles also may be pressed into the cathode and anode.

As shown in FIG. 8, the process begins by discharging an electrical current from a capacitor bank 126, between cathode 112 and anode 114. When the discharge is initiated, the fuse 110 vaporizes explosively to form the medium to maintain the discharge between the cathode and anode. The cathode and anode are designed so that erosion is essentially minimized due to substantially non-eroding material compositions such as tungsten. The pressure and temperature inside the bore 120 rapidly increase due to the fuse wire and electrode vaporization and subsequent Joule heating. The resulting plasma 128 (FIG. 9) reaches a temperature of approximately 30,000 degrees K, and rapidly vaporizes the ceramic microparticle powder which is inside the cylindrical bore. Due to the large favorable pressure gradient inside the device, which produces in-bore velocities on the order of several kilometers per second, the vapor rapidly accelerates through the bore which confines the plasma and forces the plasma to exit from both ends 130.

Some of the micron-sized particles entrained within the plasma 128 will exit as superheated vapor. Because of the different individual particle size distributions and their corresponding residence times, some of the vapor will dissociate and ionize inside the bore and contribute to the dense metal vapor plasma. This part of the process is referred to as direct gas phase conversion of ceramic powder to nanocrystalline ceramic.

This mechanism is inherently more efficient since energy is not wasted in the subsequent dissociation and ionization of the superheated vapor. In addition, vaporization of micron-sized particles is extremely efficient. The enhanced efficiency is derived primarily from the greater surface to volume ratio of the micron-sized particles compared to polycrystalline planar (flat) surface of the bore. This allows for more efficient transfer of energy and hence more effective vaporization. Other, more subtle, thermophysical processes include nearly instantaneous thermal shock fragmentation of the micron-sized particles. In addition, because of the design, the bore wall consisting of polycrystalline ceramic erodes due to ablation which is produced by a combination of surface heat transfer and mechanical shear forces. Most of the resulting ceramic vapor will be entrained in the plasma where it dissociates and ionizes to contribute to the dense metal vapor plasma inside the bore. However, some polycrystalline ceramic vapor will exit as superheated vapor to produce nanocrystalline ceramic by direct gas phase condensation.

As the process continues, the pressure and temperature rapidly increase inside the discharge bore due to the vaporization and subsequent Joule heating creating a Raleigh flow which exits from both ends of the tube. The exit velocity is the local sound speed which is several kilometers per second and the temperature and pressure are on the order of 30,000 degrees K and 100 atmospheres, respectively.

As shown in FIG. 10, the plasma jet 132 then exits into the reactor 140 in the form of a highly underexpanded supersonic plasma jet. The plasma jet expands, entrains and mixes with the reactor gas 142. Because of the rapid cooling due to the isentropic expansion, agglomeration is avoided and the particles condense to form nearly mono-dispersed nanocrystalline ceramic 144. This mechanism is a unique feature of the process. The reactor vessel is normally at or near atmospheric pressure and is filled with a suitable gas for the reaction. Gases would include but not limited to air, oxygen, nitrogen, ammonia or a combination there of.

Figure 11:
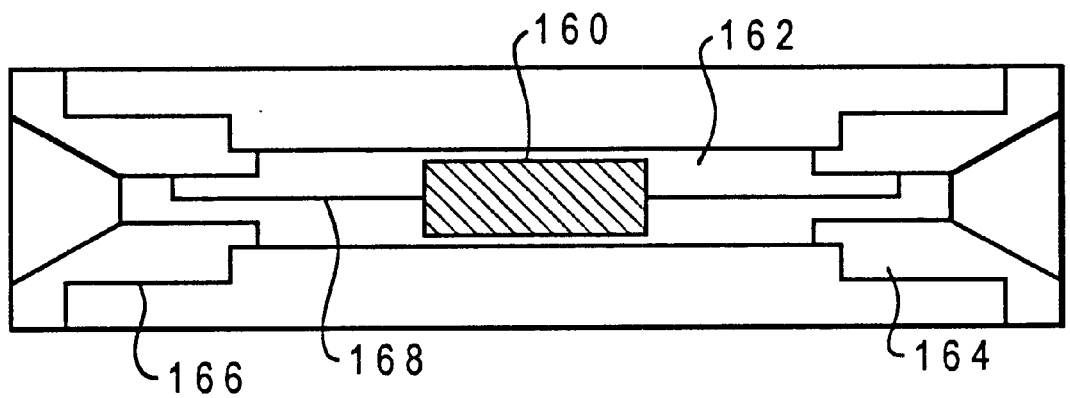
FIG. 11 is a schematic diagram of a second embodiment of a hybrid exploding wire, dual bore device having a conductive insert and is constructed in accordance with the invention.

FIG. 11 shows another embodiment of the dual bore device. In this design, a conductive insert 160 is placed in the center of the bore 162. A fuse wire 168 connects the insert to both the anode 164 and the cathode 166. The process is initiated as before, however two sparks are created; one from the cathode to the insert and one from the insert to the anode. The insert can be designed such that it erodes and/or ablates to sustain the discharge. It is manufactured from a material that will react with the reaction gas to provide the desired ceramic nanocrystalline particles. It may also contain micron particles that are vaporized to provide more efficient conversion of material. The benefit of this design is that the electrodes can be designed so that they do not wear out and the insert can be designed to be the consumable. Replacing the electrodes can be time consuming and complex since high voltage connections must be broken to replace them. In contrast, the insert can be replaced easily since there are no electrical connections. Also, since the explosive forces balance, the need for a high pressure seal is eliminated.

Figure 12:
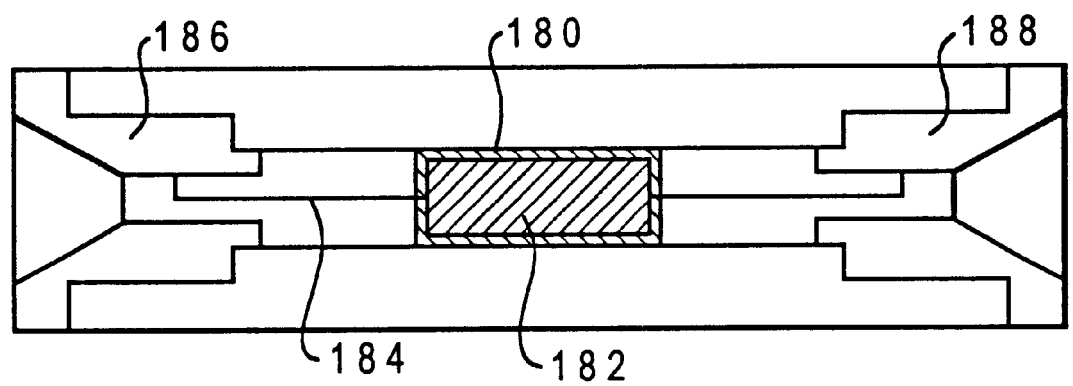
FIG. 12 is a schematic diagram of a third embodiment of a hybrid exploding wire, dual bore device having an encapsulated insert and is constructed in accordance with the invention.

FIG. 12 shows yet another embodiment in which the insert 160 of FIG. 11 is replaced with an encapsulated material. An outer coating 180 is made of a material that will instantly vaporize, such as aluminum or cellulose, and will not contaminate the production. Inside the encapsulation 180 is micron particles 182. The micron particles are typically the same material as that being produced, or material that will react with the gas to produce the nanocrystalline ceramic, or a combination thereof. A fuse wire 184 is fed through the capsule and connected to the anode 186 and cathode 188 to initiate the discharge. This design allows for efficient conversion of material by direct vaporization of the micron particles. It also eliminates the need for the high pressure seals.

For the production of aluminum nitride (AlN) in the device of FIG. 12, the fuse, cathode and anode would be aluminum. The micron-sized particles would be aluminum nitride, and the bore wall would be composed of aluminum nitride. The reactor gas would be nitrogen or ammonia at or near atmospheric pressure. Similarly, for the production of titania ($TiO_2$), the fuse, anode and cathode would be composed of titanium. The micron-sized particles and the bore wall would be titania. The reactor gas would be air or oxygen and an inert gas.

The HEW (hybrid exploding wire) device as described in this document is designed to operate in a pulse mode with electrical energy supplied by a suitable power supply. Continuous or high repetition rate operation is possible but would require active cooling of the device. For the preferred embodiment, a capacitor bank supplies the energy. The electrical energy is stored in a capacitor bank that is charged to a desired voltage, $V_0$.

Figure 13:
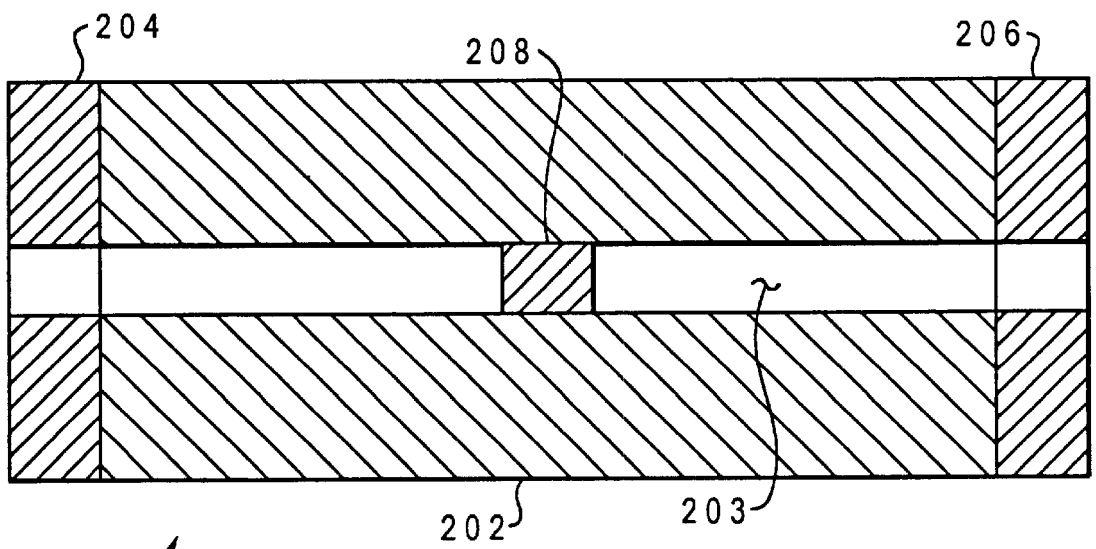
FIG. 13 is a schematic diagram of a fourth embodiment dual bore device having a central electrode and is constructed in accordance with the invention.
Figure 14:
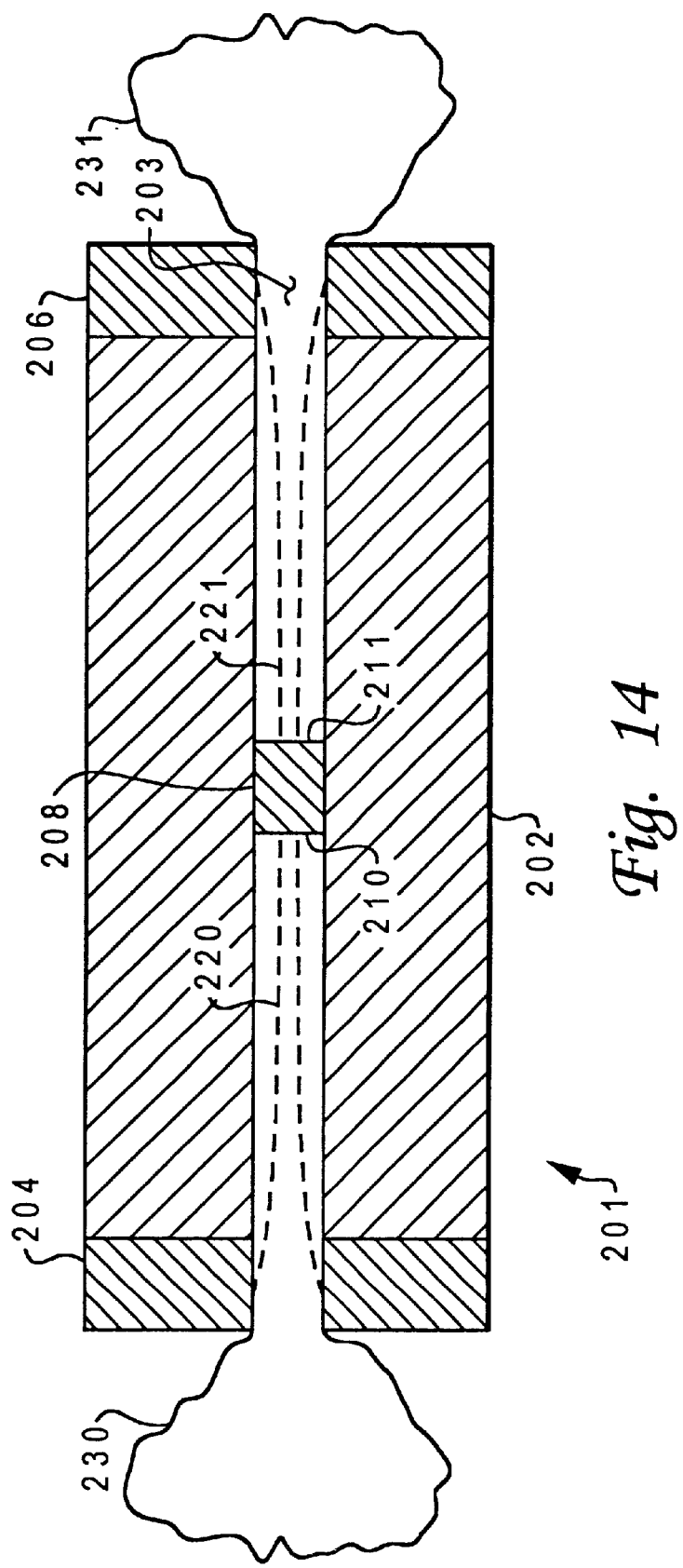
FIG. 14 is a schematic diagram of the dual bore device of FIG. 13 in operation.

Referring now to FIGS. 13 and 14, another embodiment of a dual bore or dual jet electrothermal gun 201 is shown. Dual jet electrothermal gun 201 comprises a barrel 202 with a cylindrical bore 203, a cathode 204 at one end, an anode 206 at the opposite end, and a central electrode 208 centrally located in bore 203. There are no mechanical electrical (i.e., direct) connections to central electrode 208. FIG. 14 illustrates operation of dual jet electrothermal gun 201. A first pulsed electric arc 220 (depicted by heavy dotted lines) passes from cathode 204 to the anode end 210 of central electrode 208. Simultaneously, a second pulsed electric arc 221 passes from anode 206 to the cathode end 211 of central electrode 208. Simultaneous electric arcs 220, 221 generate simultaneous high-temperature, high velocity plasma jets 230, 231 in the same manner as the single plasma jet generated in the prior art. The simultaneous plasma jets 230, 231 are introduced into an appropriate reactor atmosphere to synthesize materials as in the prior art.

Figure 15:
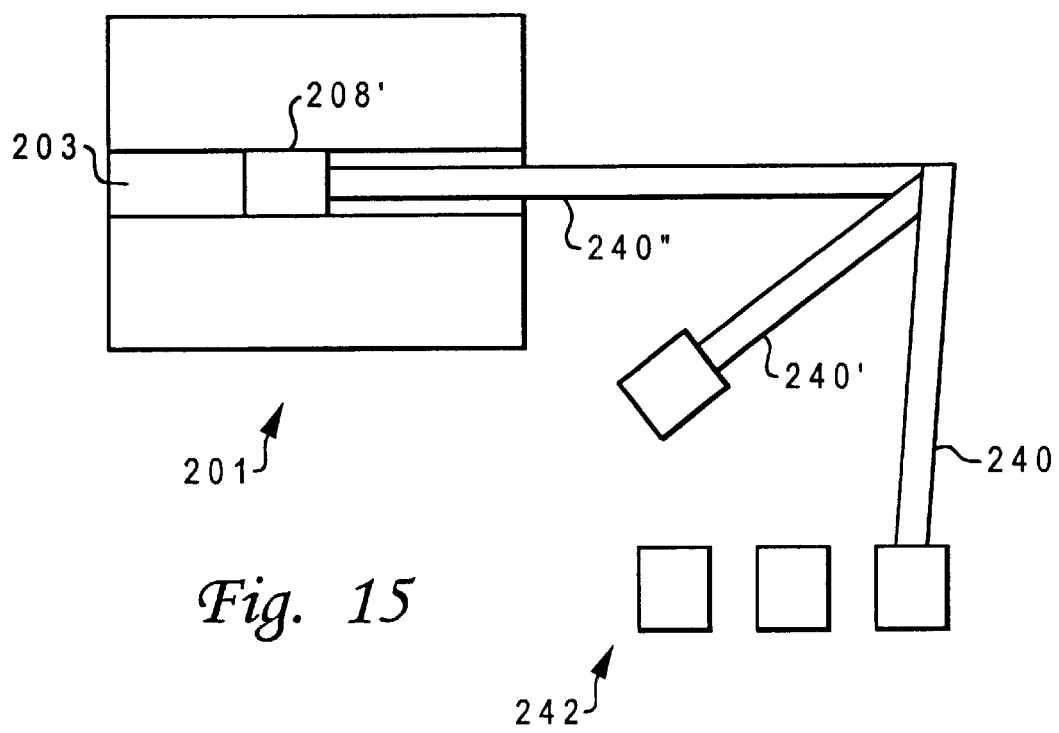
FIG. 15 is a schematic illustration of an automated reloading mechanism for the dual bore device of FIGS. 13 and 14.

FIG. 15 is a schematic illustration of reloading central electrode 208 of dual jet electrothermal gun 201 after central electrode 208 has been completely consumed. Automated loading arm 240, 240', 240" picks replacement central electrode 208' from storage magazine 242 and inserts replacement central electrode 208' into bore 203, then retracts to avoid the blast of the plasma jets described above for FIG. 14. In the prior art, automated reloading would be a much more complicated and time consuming process because of the necessity of removing the stub end of the depleted electrode, the necessity of sealing the new electrode, and the necessity of pre-loading the seal. In the prior art, the stub end of the electrode would be wasted. In the present invention it is necessary only to locate the new central electrode 208 in bore 203. In the present invention, the pressure differential to drive the backward flow of material around central electrode 208 has been drastically reduced or eliminated. In the present invention, even if plasma leaks around central electrode 208, the adverse consequences of the leak are small because the leaking plasma enters the plasma jet on the opposite side.

Simplifying the reloading procedure of an electrothermal gun for synthesizing materials increases the rate of production, decreasing production costs. The need for sealing the breech of an electrothermal gun each time a new breech electrode is reloaded slows production. Also, in a conventional electrothermal gun, each time a new breech electrode is reloaded, care must be taken to make good mechanical electrical contact between the breech electrode and the bus which supplies current to the breech electrode, good contact necessitated by the high magnitude currents employed to power electrothermal guns. To facilitate initiation of the arc, it is sometimes necessary to use a fuse wire between the breech electrode and the muzzle electrode. Since a fuse wire needs to be replaced for each shot, this can also complicate and slow the reloading procedure.

An electrothermal gun designed to fire two opposing jets simplifies and speeds reloading and eliminates the need to seal the breech of the gun and eliminates the need to make a mechanical electrical contact to the breech electrode. The opposing jet electrothermal gun has no sealed breech and no breech electrode. The bore is open at both ends and demonstrates geometric, two-fold symmetry (i.e., the gun is geometrically symmetrical about the central plane perpendicular to the axis). The gun has three electrodes including one at each end and a central electrode which fills the bore. In operation, the electrothermal gun has two arcs. One arc is initiated from the cathode (located at one end) to the near end of the central electrode.

Simultaneously, an arc is initiated from the other end of the central electrode to the anode, located at the opposite end from the cathode. These arcs produce two opposing high velocity plasma jets, one out of each end. To synthesize materials, the jets are directed into an appropriate atmosphere, as with prior single jet electrothermal guns. There is no pressure differential between the ends of the central electrode, and therefore, no tendency for plasma to flow past the central from one barrel to the other.

Loading is accomplished by pushing the central electrode into the bore. This operation is easily automated since the necessity for making mechanical and electrical contact with the central electrode has been eliminated, and the necessity of sealing the central electrode has been eliminated. A fuse wire can be attached to the central electrode so that the fuse wire protrudes from each end of the gun after loading. The operating cycle of the gun can be easily designed so the central electrode is completely consumed so that no electrode stub needs to be removed as part of the reloading cycle. The anode and cathode are located at the ends of the gun, have relatively large capacity and low consumption, and therefore require infrequent reloading.

A portion of the barrel of the electrothermal gun is consumed each time the gun is fired, more or less depending on the composition of the barrel. Tight fit of the central electrode to the bore is not absolutely necessary, but a slightly larger diameter central electrode can be reloaded each time to compensate for barrel consumption. Alternatively, a jacket can be provided with each electrode to shield the barrel so that the barrel diameter does not gradually increase as the gun is used. The disadvantage of using such a jacket is that the used jacket must be removed and collected each time the gun is reloaded.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. Those skilled in the art recognize that the process operates in a combined mode. For example, nanocrystalline alumina is produced in a chemical reaction by the conversion of solid aluminum bar into to nanocrystalline alumina particles in a reaction with gaseous oxygen. Also, solid microphase material is converted to nanophase powder with no change in chemistry, for example the conversion of solid alumina ceramic bore into nanophase alumina particles by the ablation process. In both cases, there are no byproducts produced. In addition, reactions go to completion in approximately one millisecond which produces a gas suspension of nanocrystalline particles. The nanocrystalline particles can then be removed from the suspension. It is therefore contemplated that such modifications can be made without departing from the spirit or scope of the present invention as defined in the appended claims.

What is claimed:

1. A system for producing powder, comprising:
    a reactor vessel having an interior cavity with two open-ended exit ports;
    an anode mounted adjacent to one of the exit ports;
    a cathode mounted adjacent to the other of the exit ports; and wherein
    at least portions of the anode and the cathode are vaporized for generating powder via both exit ports.

2. The system of claim 1 wherein the interior cavity of the reactor vessel is a cylindrical bore and the exit ports are located at axial ends of the bore.

3. The system of claim 1 wherein the anode and the cathode are formed from the same material.

4. The system of claim 1, further comprising microparticles located within the interior cavity of the reactor vessel.

5. The system of claim 1, further comprising an automated loading mechanism for automatically reloading the reactor vessel.

6. A system for producing powder, comprising:
    a reactor vessel having an interior cavity with two open-ended exit ports;
    an anode mounted adjacent to one of the exit ports;
    a cathode mounted adjacent to the other of the exit ports; and
    production means for generating powder via both exit ports in response to a discharge.

7. The system of claim 6 wherein the production means includes ignition means associated with the reactor vessel for initiating the discharge therein.

8. The system of claim 6 wherein the interior cavity of the reactor vessel is a cylindrical bore and the exit ports are located at axial ends of the bore.

9. The system of claim 7 wherein the ignition means is a fuse extending between the anode, the cathode, and the production means.

10. The system of claim 6 wherein the anode and the cathode are formed from the same material.

11. The system of claim 6 wherein the production means vaporizes to force plasma out of both exit ports.

12. The system of claim 6, further comprising microparticles located within the interior cavity of the reactor vessel.

13. The system of claim 6 wherein the production means is a conductive insert.

14. The system of claim 7 wherein the production means is a conductive insert located approximately in a center of the interior cavity of the reactor vessel, and wherein the ignition means is a fuse.

15. The system of claim 6 wherein the production means is an encapsulated insert.

16. The system of claim 7 wherein the production means is an encapsulated insert located in approximately a center of the interior cavity of the reactor vessel, and wherein the ignition means is a fuse.

17. The system of claim 6 wherein the production means is an electrode located in the interior cavity of the reactor vessel.

18. The system of claim 6, further comprising an automated loading mechanism for automatically reloading the production means in the reactor vessel.

19. An electrothermal gun for producing nanoscale particles, comprising:
    a reactor vessel having a cylindrical bore with two open ends and a reactor chamber at the ends containing a reactor gas;
    an anode mounted to one of the ends of the bore;
    a cathode mounted to the other of the ends of the bore;
    ignition means associated with the reactor vessel for initiating a discharge therein; and
    production means located within the bore of the reactor vessel for vaporizing in response to the discharge and forcing plasma to exit from both ends of the bore to generate nanoscale particles in the reactor chamber.

20. The electrothermal gun of claim 19 wherein the production means is a fuse sheath extending between the anode and cathode.

21. The electrothermal gun of claim 19 wherein the anode and the cathode are formed from the same material.

22. The electrothermal gun of claim 19, further comprising microparticles located within the bore of the reactor vessel.

23. The electrothermal gun of claim 19 wherein the production means is an insert located approximately in an axial center of the bore, and wherein the ignition means is a fuse.

24. The electrothermal gun of claim 23 wherein the insert is conductive.

25. The electrothermal gun of claim 23 wherein the insert is encapsulated.

26. The electrothermal gun of claim 23 wherein the insert is an electrode.

27. The electrothermal gun of claim 19, further comprising an automated loading mechanism for automatically reloading the production means in the reactor vessel.

28. A method of producing powder, comprising:
(a) providing a reactor vessel with a cavity having two open-ended exit ports, an anode, and a cathode;
(b) applying a voltage across the anode and cathode to initiate a discharge; then
(c) vaporizing material in response to the discharge to form a plasma that exits both exit ports to generate powder.

29. The method of claim 28 wherein step (a) further comprises providing microparticles in the cavity, and wherein step (c) further comprises vaporizing and converting the microparticles into nanosized particles.

30. The method of claim 28 wherein step (c) comprises vaporizing and converting portions of the anode and the cathode into powder.

31. The method of claim 28 wherein step (c) comprises vaporizing a production material into powder.

32. The method of claim 28 wherein step (c) comprises ablating a conductive insert located approximately in a center of the cavity into powder.

33. The method of claim 28, further comprising the step of automatically reloading production material in the reactor vessel.

* * * * *